United States Patent [19]
Aguas

[11] 3,873,284
[45] Mar. 25, 1975

[54] SMOKE STACK WASHER

[76] Inventor: Cayetano Aguas, 214 1st St., Seal Beach, Calif. 90740

[22] Filed: Oct. 12, 1973

[21] Appl. No.: 405,783

[52] U.S. Cl............... 55/228, 55/260, 110/119, 261/DIG. 9
[51] Int. Cl............................................ B01d 47/06
[58] Field of Search .............. 55/223, 228, 244, 260; 261/118, 126, DIG. 9; 110/119

[56] References Cited
UNITED STATES PATENTS

| | | |
|---|---|---|
| 973,775 | 10/1910 | Goodrich ............................ 261/126 |
| 1,800,395 | 4/1931 | McCandless ........................ 261/126 |
| 1,818,143 | 8/1931 | Lyons ................................. 261/126 |
| 1,948,348 | 2/1934 | Gerhold .............................. 261/126 |
| 2,164,833 | 7/1939 | Norman ................................. 55/227 |

Primary Examiner—Bernard Nozick

[57] ABSTRACT

This invention relates to a Smoke Filter particularly for industrial plants where a large volumne of smoke is emitted from a smoke stack.

1 Claim, 4 Drawing Figures

PATENTED MAR 25 1975
3,873,284
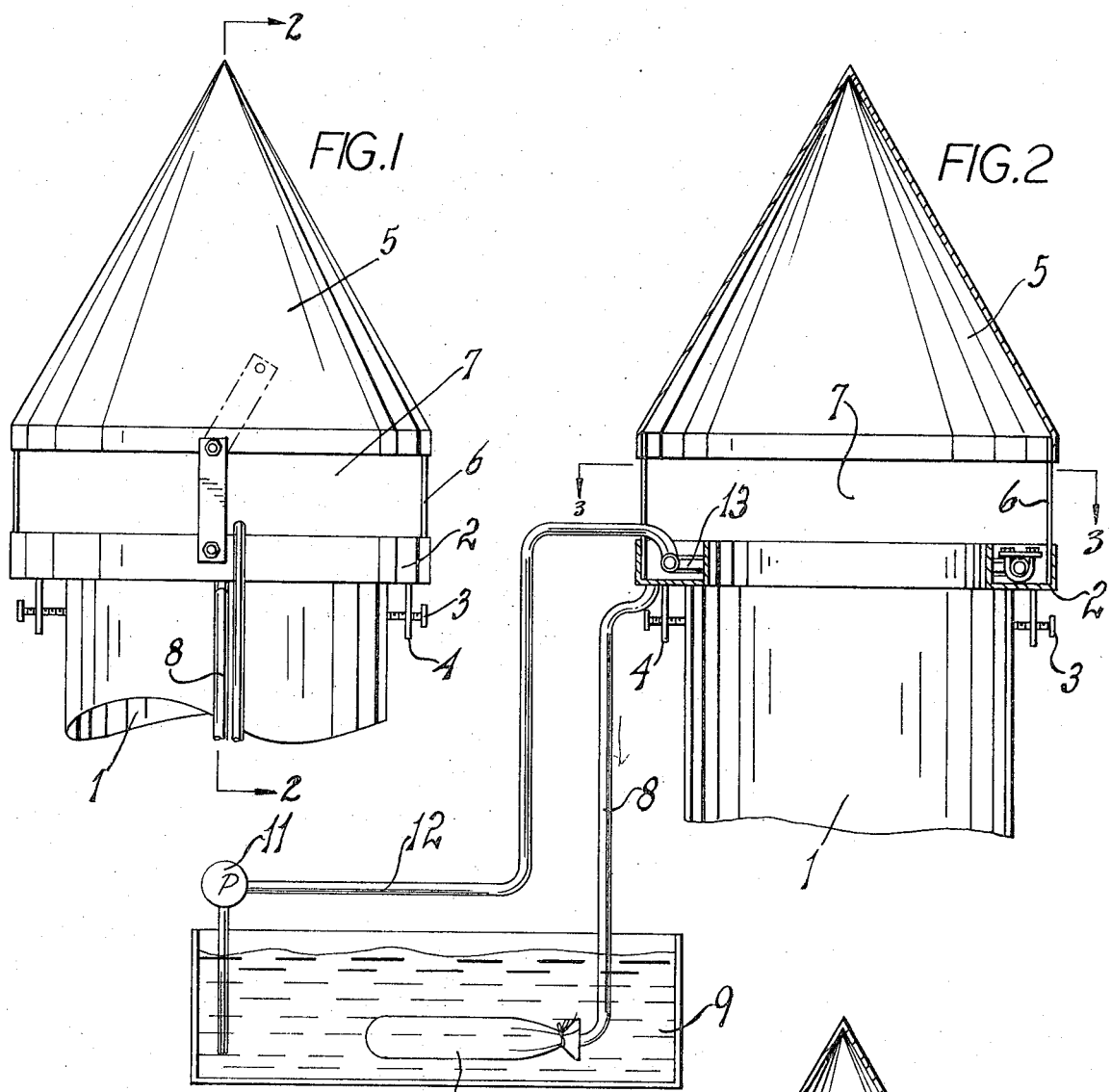
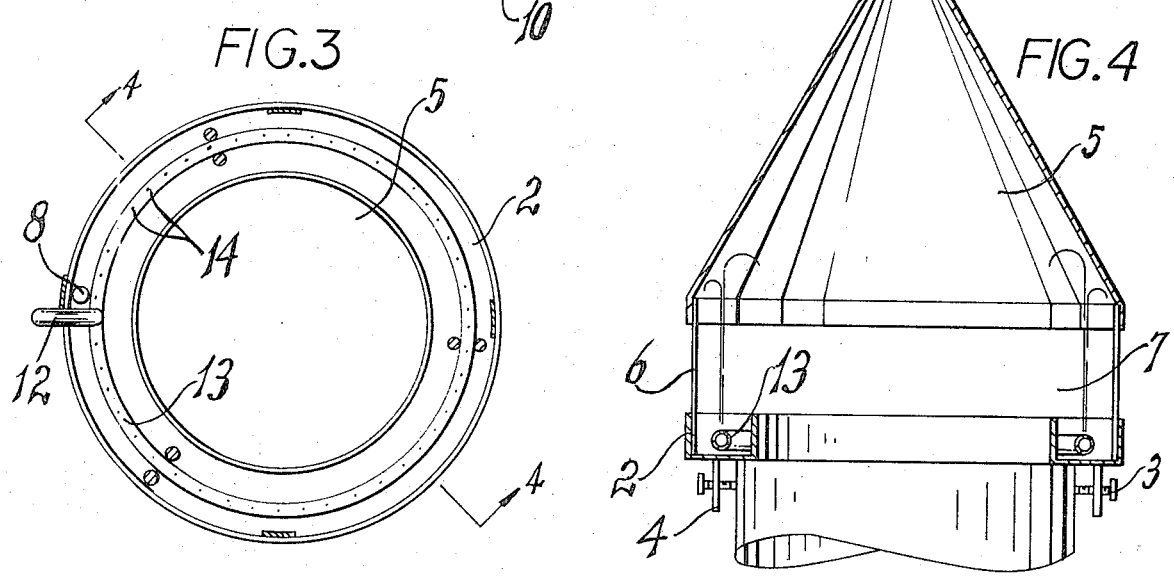

SMOKE STACK WASHER

An object of my invention is to provide an attachment for the smoke stack of an industrial plant whereby noxious gases and solid particles such as carbon are collected; dissolved and are entrained in the water.

Another object is to provide a novel smoke filter which can be readily mounted on any usual commercial smoke stack.

Other objects, advantages and features of my invention may appear from the accompanying drawing, the sub-joined detailed description and the appended claims.

In the drawing:

FIG. 1 is a side elevation of my smoke filter.

FIG. 2 is a vertical sectional view of my smoke filter.

FIG. 3 is a sectional view taken on line 3—3 of FIG. 2.

FIG. 4 is a sectional view taken on line 4—4 of FIG. 3.

The smoke stack 1 is the usual tubular structure which extends from a commercial furnace or the like. My smoke filter is mounted on top of the stack 1 as shown and consists of an annular trough 2 which is secured to the smoke stack 1 by means of threaded studs 3 which extend through the depending lugs 4. The trough 2 is open at the top so that smoke can be deflected downwardly into the trough where it comes in contact with a body of water as will be subsequently described. A hood 5 is mounted above the trough 2 and spaced therefrom by fingers 6. These fingers also provide an outlet space 7 from which the smoke flows. A drain pipe 8 extends from the bottom of the trough 2 and thence into a storage tank 9 in which a body of water is stored. The drain pipe 8 extends to a filter bag 10 which is positioned within the tank 9 and filters the water which flows from the trough 2. Water is continuously circulated in the trough 2 by a pump 11 which forces water through the pipe 12 from the tank 9 and thence into the trough 2. The pipe 12 is connected to a circular pipe 13 having holes 14 from which water flows into the trough 2. Thus a circular body of water is provided under the hood 5 and in which noxious gases are trapped as well as solid particles such as carbon.

Having described my invention, I claim:

1. In combination with a smoke stack that has an upper open end portion which discharges smoke containing fine particles into the ambient atmosphere, a device for removing and collecting said particles, which device includes:
   a. a hood disposed above said upper open end portion of said stack, with said hood being of such shape as to deflect said smoke downwardly and outwardly relative to said hood;
   b. first means for supporting said hood in a fixed position above said upper open end portion of said stack, with said stack and hood cooperatively defining a circumferentially extending space;
   c. a ring-shaped trough that extends around said upper open end portion and to which said first means is secured, said trough having a drain opening formed therein;
   d. second means for securing said trough to said upper open end portion;
   e. a reservoir containing a liquid, with said reservoir being located a substantial distance below said hood;
   f. a circular tubular distributor disposed in a fixed elevated position in said trough, said tubular distributor having a number of spaced holes therein through which jets of said liquid may be discharged upwardly to span said space, which distributor has a liquid inlet formed therein;
   g. a power-driven pump having a discharge and an inlet provided therein;
   h. first conduit means connecting said pump inlet to liquid in said reservoir and said discharge of said pump to said inlet in said distributor;
   i. a filter bag disposed in said reservoir; and
   j. second conduit means connecting said drain opening to the interior of said bag, with said particles in said smoke becoming entrained with said liquid in said jets as said smoke discharges through said space into the ambient atmosphere, with said liquid and said entrained particles flowing into the interior of said bag by force of gravity, and with said liquid free of said entrained particles flowing through said bag whereupon it subsequently enters said pump and is again used to form said jets to remove additional particles from said smoke.

* * * * *